D. C. SLAGHT.
HILL CLIMBING WHEEL.
APPLICATION FILED AUG. 18, 1909.
965,030.
Patented July 19, 1910.
2 SHEETS—SHEET 1.
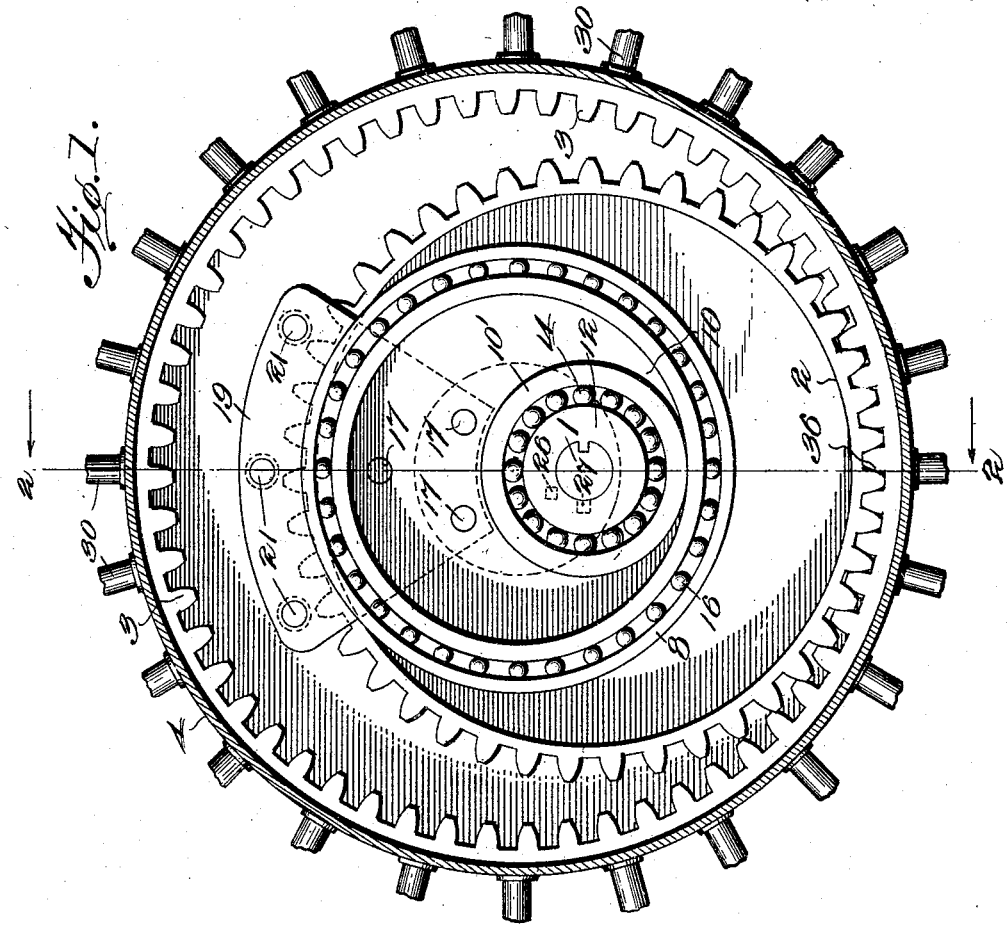
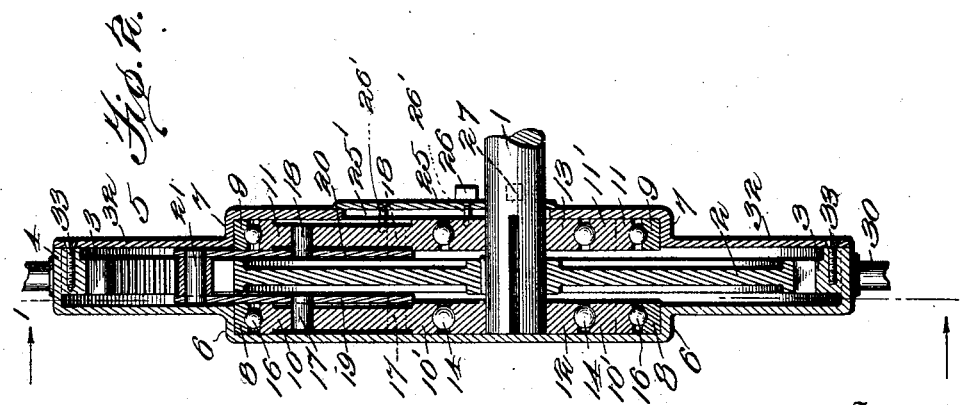

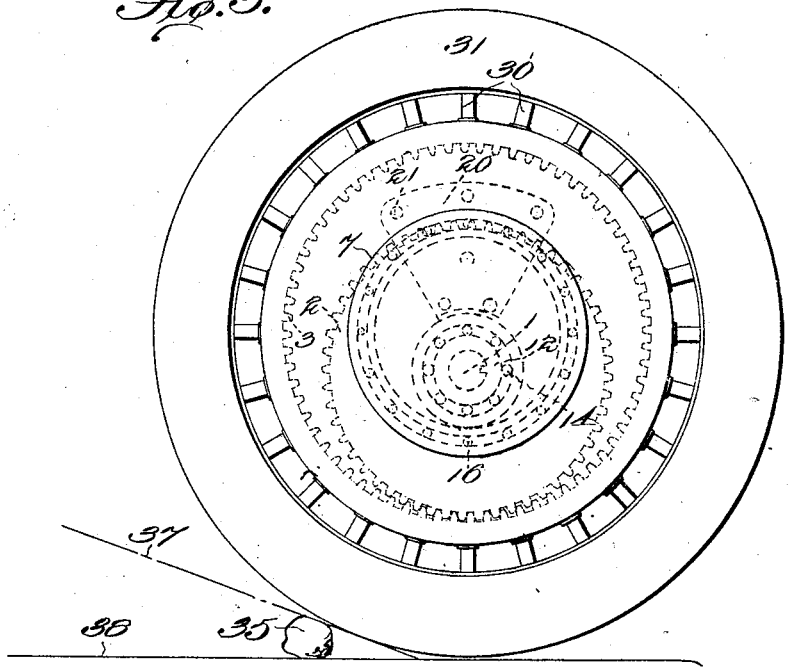

UNITED STATES PATENT OFFICE.

DANIEL C. SLAGHT, OF EASTON, PENNSYLVANIA.

HILL-CLIMBING WHEEL.

965,030.  Specification of Letters Patent.  Patented July 19, 1910.

Application filed August 18, 1909. Serial No. 513,500.

*To all whom it may concern:*

Be it known that I, DANIEL C. SLAGHT, a citizen of the United States, residing at Easton, in the county of Northampton and State of Pennsylvania, have invented certain new and useful Improvements in Hill-Climbing Wheels; and I do hereby declare the following to be a full, clear, and exact description of the invention, such as will enable others skilled in the art to which it appertains to make and use the same.

This invention relates to vehicle wheels and especially to wheels adapted to climb hills or to readily run over obstructions without sudden jars or jolts.

The invention consists in the novel details of construction and combinations of parts as more fully hereinafter disclosed and particularly pointed out in the claims.

Referring to the accompanying drawings forming a part of this specification in which like numerals refer to like parts in all the views:—Figure 1, is a sectional side elevational view of the invention, taken on the line 1—1 of Fig. 2, and showing those parts which would appear if the side of the casing only were removed. Fig. 2, is a vertical central sectional view taken on the line 2—2 of Fig. 1, and showing the relation of parts, Fig. 3, is a side elevational view of a completed wheel, as seen from the outside, and showing the interior parts in dotted lines; and, Fig. 4, is a side elevational view of a completed wheel looking in a direction opposite to that from which Fig. 3 is seen.

1 represents any suitable axle for the wheel, on which is keyed or otherwise concentrically secured the toothed wheel 2, adapted to intermesh with and to roll on the interior surface of the larger and eccentrically mounted toothed wheel, 3, carried by the flange 4 of the casing 5. The casing 5 is preferably offset at 6 and 7 to accommodate the rings 8 and 9 which may be rigidly secured to said casing if desired, and which constitute the outer members of ball bearing eccentrics of which 10 and 11 are the inner members. The inner members 10 and 11 are provided with circular openings, preferably surrounded by integral rings 10' and 11' in which fit the circular disks 12 and 13, separated from said rims 10' and 11' by the balls 14, on which they roll, all as illustrated. The disks 12 and 13 are centrally perforated to receive the shaft or axle 1, to which they are preferably rigidly secured.

So far as now disclosed, if the axle or shaft 1 be turned it will cause the disks 12 and 13 to turn on the balls 14, and will cause the toothed wheel 2 to roll on the inside of the gear wheel 3, thereby turning the latter and the casing 5 with it; while the casing 5 will also cause the outer rings 8 and 9 to turn on the balls 16.

Secured to the eccentrics 10 and 11 by means of fastenings 17 and 18, are sector shaped plates 19 and 20, which are secured together at their outer edges by the fastenings 21. Therefore, when the rings 8 and 9 turn in the manner above described, they together with the balls 16 will roll on the eccentrics 10 and 11 as will be readily understood.

On the side of the casing 5 is a plate 25 connected to the eccentric 10 by means of bolts 26'. This plate closes up the opening in the casing shown at 25, and is provided with a lug 26, while the shaft has a lug 27 located at about 90° from the lug 26, when the parts are in their normal position. This lug acts as a stop for the plate 25, and, therefore, limits the angular motion of the eccentrics 10 and 11. The casing, however, is not attached to the plate 25, and owing to its cut-away portion through which the bolts 26' pass, may revolve continuously.

30 represents any suitable spokes for the wheel and 31 any suitable tire.

32 represents a removable plate of the casing 5, secured to the face of the wheel 3, by means of the fastenings 33. By removing this plate 32 all the parts are conveniently assembled, as will be understood.

The operation of this invention is as follows: It is well known that in order to get the best effects the turning force on a wheel should be directed along a tangent thereof, which is parallel to the wheel's support, or in a direction perpendicular to that radius of the wheel which contacts with its support. It is also well known that in ordinary cases when the wheel is on level ground the turning force is directed parallel to the ground and, therefore, it is utilized in the most efficient manner; while it is partially expended in lifting the vehicle when the ordinary wheel is climbing a hill or runs over an obstruction and that the tractive force is, therefore, in such instance lessened. In such cases the total turning force may be resolved into a force exerted vertically downward, and represented by the weight of the vehicle, and into a force exerted along a tangent of the wheel which serves to turn the same. In the case of the wheel above disclosed, supposing it to rest on level ground, if the shaft 1 is turned for traction purposes, the wheel tire 31 will be turned by means of the gears 2 and 3, and the tractive effort will be directed parallel to the ground, as in the ordinary wheel. If while the vehicle is moving on level ground, however, the wheel tire should strike an obstruction, as indicated at 35, Fig. 3, the tire and gear wheel 3 will be momentarily stopped while the momentum of the vehicle acting through the shaft 1, will force the gear wheel 2 to engage other teeth on the inner surface of the wheel 3, and, thereupon, contact with said inner surface at a point removed some distance from and higher up than the point of contact 36 shown in Fig. 1. The axle 1 will also rise after this new position has been assumed, and since this rising also places said axle in front of the previous points of contact of the wheels with the ground a tractive force is produced, whereby the weight of the vehicle is made to aid in driving the wheels. This action will be greatly aided in the case of obstructions by the momentum of the vehicle which, not only drives the vehicle forward, but is gradually instead of suddenly expended, and, therefore, without material shock in raising the center of gravity of the system. Of course, the same action takes place whether the vehicle is moving forward or backward, or whether the vehicle is impelled forward by traction or is drawn by any suitable power. But perhaps the most important action of the improved wheel is experienced when climbing a grade. Suppose the grade has an inclination as represented by the line 37 in Fig. 3. As soon as the wheel strikes such a grade the axle will rise and move forward in the wheel 3, so that said axle occupies an eccentric position in said wheel and the point of contact will be raised and also moved forward while the tractive effort will be directed parallel to the grade instead of parallel to the line 38, as would be the case if said axle did not so move relatively to the wheel 3. Therefore, with this improved wheel the wheel 3 acts as if it were an eccentric and the full tractive effort will always be exerted in its most efficient direction when climbing hills. Furthermore, upon meeting a grade the shock is gradually absorbed, and the momentum of the system utilized in bringing the parts to their new positions, all as above disclosed. The same action also takes place whether the wheel is going backward or forward, or whether it is being driven by traction or drawn by other power. In all cases, the eccentrics 10, and 11, their plates 19 and 20, and coacting parts, constitute firm bearings and render the action of the wheel certain and safe.

When the gear wheel 2 in going forward rides up the inner surface of the wheel 3 as disclosed above, the lug 26 on the plate 25 will limit its motion by coming into contact with the lug 27 on the axle 1, so that the contacting point 36 between the wheels 2 and 3 can never move an angular distance greater than that separating these two lugs. Similar stops could be provided for limiting this motion when the wheel is moving backward, but under ordinary conditions they will not be required.

It is recognized that changes in the details of construction and in the arrangement of parts may be made by those skilled in the art without departing from the spirit of the invention, and, therefore, it is not desired to limit this invention to such features, except as may be required by the claims.

What I claim is:

1. In a vehicle wheel the combination of an axle; a gear wheel concentrically mounted thereon; a second gear wheel surrounding said first gear wheel eccentrically mounted on said axle and intermeshing with said first gear wheel; means permitting said axle to rise and move eccentrically with relation to said second wheel when an obstruction is encountered; and an eccentric ball bearing carried by said second gear wheel; substantially as described.

2. In a vehicle wheel the combination of an axle; a gear wheel concentrically mounted thereon; a second gear wheel eccentrically mounted on said axle and intermeshing with said first gear wheel; means permitting said axle to rise and move eccentrically with relation to said second wheel when an obstruction is encountered; a tread portion driven by said second wheel; and an eccentric ball bearing carried by said second gear wheel; substantially as described.

3. In a vehicle wheel the combination of an axle; a gear wheel concentrically mounted thereon; a second gear wheel eccentrically mounted on said axle and intermeshing with said first gear wheel; means permitting said axle to rise and move eccentrically with relation to said second wheel when an obstruction is encountered; an eccentric ball bearing carried by said second gear wheel; and a ball bearing for said axle in said eccentric ball bearing; substantially as described.

4. In a vehicle wheel the combination of an axle; a ball bearing mounted thereon; an eccentric mounted on the ball bearing; a casing mounted on the eccentric; a gear 3 carried by the casing; a tire carried by the casing; and a gear 2 concentrically mounted on said axle and intermeshing with said gear 3; substantially as described.

5. In a vehicle wheel the combination of an axle; a plurality of ball bearings mounted thereon; a plurality of eccentrics mounted on the ball bearings; a casing mounted on the eccentrics; a gear 3 carried by the casing; a tire carried by the casing; and a gear 2 concentrically mounted on said axle between said ball bearings and said eccentrics and intermeshing with said gear 3; substantially as described.

6. In a wheel the combination of an axle having a lug 27; a gear 2 concentrically mounted on said axle; a gear 3 with which said gear 2 engages eccentrically mounted on said axle; and a lug 26 movably mounted with respect to said gear 3 and adapted to contact with said lug 27; substantially as described.

7. In a wheel the combination of an axle having a lug 27; a gear 2 concentrically mounted on said axle; a gear 3 with which said gear 2 engages eccentrically mounted on said axle; a casing inclosing said gears; and a lug 26 movably mounted with respect to said casing and gear 3 and adapted to contact with said lug 27 after said gear 3 has eccentrically moved with relation to said gear 2 a predetermined angular distance; substantially as described.

8. In a wheel the combination of an axle having a lug 27; a gear 2 concentrically mounted on said axle; a pair of disks concentrically mounted on said axle; a plate 25 having a lug 26 also mounted on said axle; a pair of eccentrics mounted on said disks; anti-friction balls between said eccentrics and disks; a pair of rings mounted on said eccentrics; a casing mounted on the rings; and a gear 3 carried by the casing and engaging said gear 2; substantially as described.

9. In a wheel the combination of an axle having a lug 27; a gear 2 concentrically mounted on said axle; a pair of disks concentrically mounted on said axle; a plate 25 having a lug 26 also mounted on said axle; a pair of eccentrics mounted on said disks; anti-friction balls between said eccentrics and disks; a pair of rings mounted on said eccentrics; anti-friction balls between said rings and said eccentrics; a casing mounted on the rings; a gear 3 carried by the casing and engaging said gear 2; spokes carried by the casing; and a tire carried by said spokes; substantially as described.

In testimony whereof, I affix my signature, in presence of two witnesses.

DANIEL C. SLAGHT.

Witnesses:
    CLARENCE BECK,
    J. BRUNNER.